UNITED STATES PATENT OFFICE.

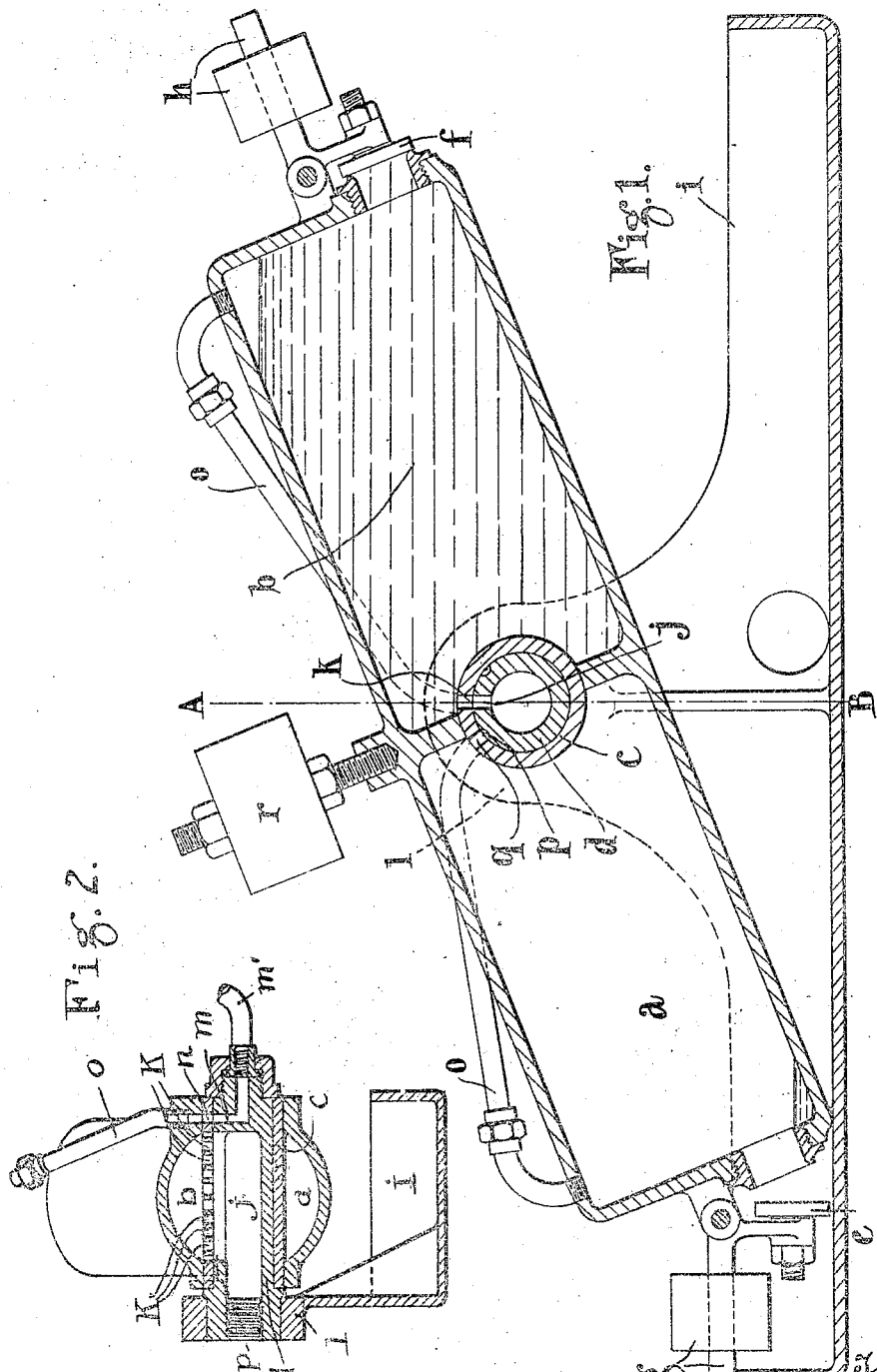

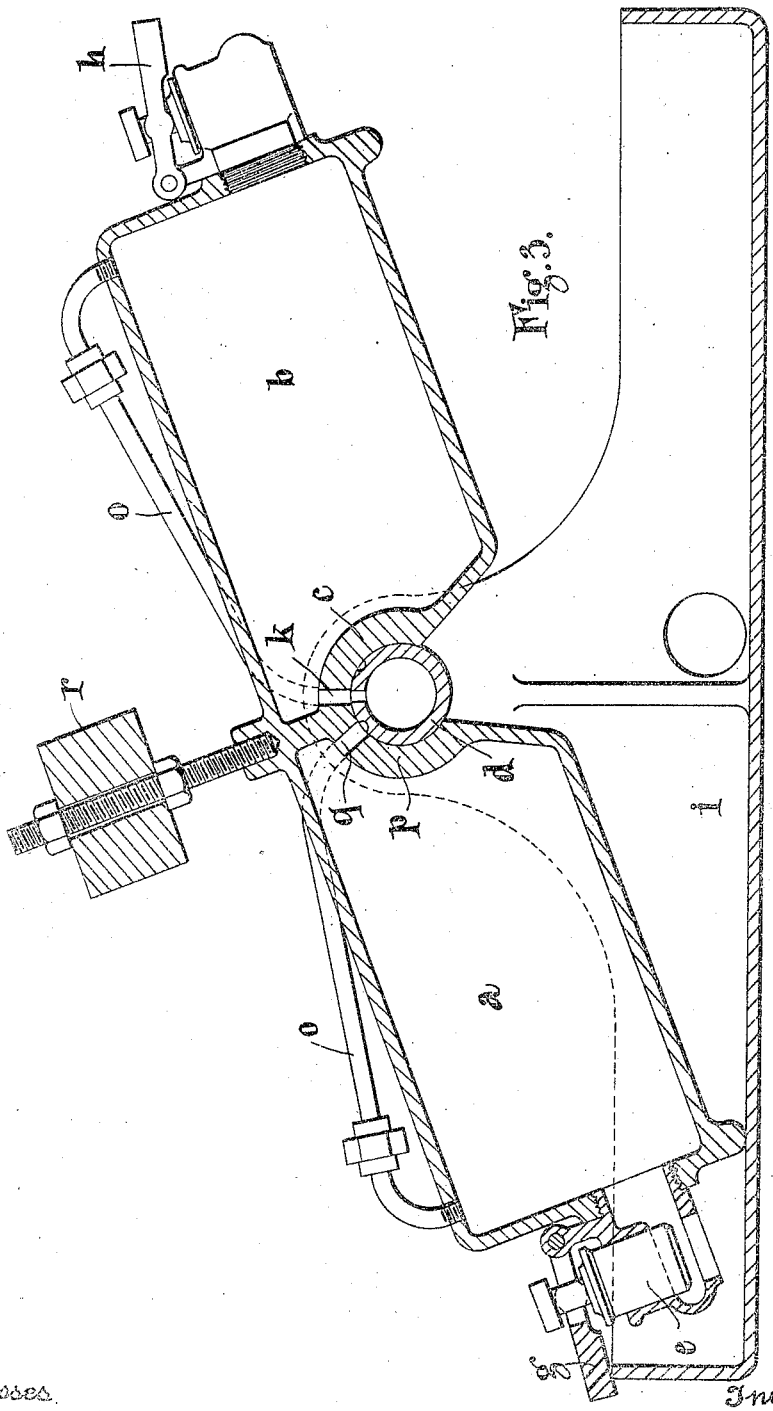

JOHN EDWARD LEWIS OGDEN, OF LISCARD, ENGLAND.

STEAM AND VACUUM TRAP.

1,047,437.   Specification of Letters Patent.   Patented Dec. 17, 1912.

Application filed June 10, 1911. Serial No. 632,431.

*To all whom it may concern:*

Be it known that I, JOHN EDWARD LEWIS OGDEN, subject of the King of Great Britain and Ireland, residing at Penshurst, Lincoln Drive, Liscard, in the county of Chester, England, have invented certain new and useful Improvements in Steam and Vacuum Traps; and I declare the following to be a full, clear, and exact description of the invention, such as will enable others skilled in the art to which it appertains to make and use the same.

This invention relates to steam and vacuum traps intended for working under a vacuum or under low pressure conditions, its object being to provide an efficient and simple apparatus having but few working parts and capable of being economically manufactured.

My invention comprises the improved combination of parts hereinafter described and claimed.

Referring to the two accompanying sheets of explanatory drawings:—Figure 1 is a sectional elevation of an apparatus constructed in one convenient form according to my invention. Fig. 2 is a sectional elevation on the line A B and looking from left to right, of Fig. 1. Fig. 3 is a view corresponding to Fig. 1 but showing a modified arrangement of apparatus.

The same reference letters in the different views indicate the same or similar parts.

The liquid collecting chamber of the trap is divided into two chambers or compartments $a$, $b$ by a division wall or partition secured to or formed integrally with a sleeve like member $c$, which fits over and is capable of free rotary movements upon a hollow supporting shaft or spindle $d$, which also forms the water inlet pipe of the trap. The said sleeve $c$ and hollow spindle $d$ have ports or apertures therein which are brought into and out of coincidence or alinement with one another by the tilting or oscillating movement of the water collecting chamber, as hereinafter described.

Upon the end face of each portion of the water collecting chamber I provide a valve as $e$, $f$ of the ordinary flap or other type which may be loaded, as by a lever and weight $g$, $h$, if the trap is working under low pressure conditions. Beneath the said chamber is situated a trough or like shallow vessel $i$ (preferably having a bracket $l$ thereon for supporting the hollow spindle $d$ before referred to) for receiving the discharge from the water collecting chamber.

The operation of the apparatus is as follows:—In its normal working position, the water collecting chamber rests with one end as $a$, Fig. 1, within the trough $i$ beneath it and the other end $b$ raised clear thereof. The valve $f$ on the upper or raised portion is held closed by the difference of pressure at its two sides or by a weight. The valve on the lower portion is caused to open by the unbalanced weight of water within its part of the collecting chamber; or the said valve may be positively opened by the weighted arm or lever $g$ (see Fig. 1) secured thereto striking the wall of the trough $i$ as the chamber tilts. With the parts in the positions aforesaid, one slot or aperture $j$ in the portion of the sleeve $d$ (attached to the collecting chamber) within the upper part $b$ of the collecting chamber coincides with a similar slot or series of slots $k$ in the hollow spindle $c$ so that the water of condensation can flow from the latter to the upper part of the collecting chamber. A further slot $m$ in the hollow spindle which communicates by way of a pipe $m'$ with the vacuum or vapor space of the pipe line or vessel being drained is also in coincidence with a slot $n$ in the sleeve $c$ which communicates by a pipe $o$ with the outer end of the upper portion $b$ of the collecting chamber, so that the said portion is under the same pressure conditions as the vessel being drained, and water will therefore freely flow thereto by gravity. The lower portion $a$ of the collecting chamber is entirely cut off from the vessel or pipe line being drained, but by means of a groove $p$ in the hollow spindle $d$ and an aperture $q$ through the sleeve $c$ communicates with the atmosphere so that air can freely flow into the discharging chamber to replace the liquid passing therefrom. The groove $p$ and its connection with the exterior of the trap are indicated (for the sake of simplicity in the illustration) in Fig. 2 by dotted lines, but as will be seen from Fig. 1 the said aperture communicates with the portion *a* of the liquid chamber when the parts are in the positions shown. As the water of condensation flows into the upper portion *b* of the chamber from the hollow spindle *d*, and the water in the lower portion *a* of said chamber passes into the trough *i* beneath, the chamber tends to over-balance or tilt around said spindle *d* and after the upper portion of the chamber has partly or nearly filled does tilt so that the upper portion of the chamber becomes the lower and vice-versa. The lower and full portion is immediately cut off from communication with the interior of the hollow spindle and with the vacuum or vapor space of the vessel or system being drained and put into communication with the atmosphere, while the upper and empty portion is cut off from communication with the atmosphere and put into communication with the hollow spindle and the vacuum or vapor space of the vessel being drained.

When the water collecting chamber is placed in the mid-way position, with neither end within the trough *i*, all the ports in the sleeve and hollow spindle are closed. The discharge valves can then be cleaned or otherwise attended to. When the said chamber is again tilted, the trap re-commences to work.

To prevent a too-ready movement of the liquid collecting chamber before sufficient liquid has accumulated in the upper portion thereof and to prevent the said chamber balancing in a midway position, I provide a weight *r* which opposes the downward movement of the upper end of the said chamber. When, however, the said end of the chamber is sufficiently filled with water to over-balance the weight, the chamber tilts and the effect of the weight is gradually neutralized; finally the weight acts to accelerate the movement of the chamber.

When the apparatus is working under low pressure conditions, I may make the discharge valves *e*, *f* of the type shown at Fig. 3 where the valve stems are of the same diameter as the valves, to neutralize the effect of the pressure within the trap upon the valves. By this means I obviate the necessity for a heavy weight for maintaining the valve in its closed position and also prevent any disturbance of the action of the trap due to the said weight at one end of the trap being supported by the trough, while the weight at the other end is borne by the raised portion of the collecting chamber.

By the employment of my invention, I provide for a practically continuous discharge of the water of condensation or like liquid content of the vessel or system being drained and further, as the whole of the wear due to the relative movements of the sleeve and hollow spindle is at the upper portion of the latter where the ports are situated and where the weight of the collecting chamber insures a tight joint between the sleeve and spindle, leakage at the ports is reduced to a minimum.

Having now described my invention, what I claim as new and desire to secure by Letters Patent is:—

1. A combined steam and vacuum trap comprising a collecting chamber formed from two independent and equal compartments having a division wall between them, a hollow spindle passing through the center of the division wall and around which said liquid collecting chamber oscillates, said spindle having ports which alternately place each compartment of said chamber into communication with the liquid space of the system being drained, said spindle also having ports for placing the steam space of the system being drained alternately into communication with the extreme upper end of each compartment of said chamber, said spindle also having other ports for alternately placing each compartment in communication with the atmosphere, all of said ports being controlled by the movements of said chamber, and discharge valves on the face of each compartment.

2. A combined steam and vacuum trap comprising in combination, a liquid collecting chamber formed from two independent compartments, a hollow spindle disposed between said compartments and around which said liquid collecting chamber oscillates, ports in said spindle, alternately placing each compartment of said chamber simultaneously in communication both with the liquid and with the steam spaces of the system being drained, other ports in said spindle alternately placing each compartment in communication with the atmosphere, all of said ports being controlled by the movements of the chamber, a trough beneath said chamber, and discharge valves on the face of each compartment alternately discharging into said trough.

3. A combined steam and vacuum trap comprising in combination, a liquid collecting chamber formed from two independent compartments, a hollow spindle passing through the division between said compartments and around which said liquid collecting chamber oscillates, ports in said spindle alternately placing each compartment of said chamber simultaneously in communication both with the liquid and with the steam spaces of the system being drained, other ports in said spindle alternately placing each compartment in communication with the atmosphere, all of said ports being controlled by the movements of the chamber, a trough beneath said chamber supporting said hollow spindle, discharge valves on the face of each compartment positively operated by said trough and alternately discharging thereinto, an arm carried by the wall of said chamber at a point between said compartments and an adjustable weight upon said arm, as set forth.

In testimony whereof I have hereunto set my hand in presence of two subscribing witnesses.

JOHN EDWARD LEWIS OGDEN.

Witnesses:
 ARTHUR HUGHES,
 CHARLES CONRAD.